(12) United States Patent
Hao

(10) Patent No.: US 9,235,088 B1
(45) Date of Patent: Jan. 12, 2016

(54) LIQUID CRYSTAL DISPLAY PANEL AND FABRICATION METHOD FOR THE SAME

(71) Applicant: Shenzhen China Star Optoelectronics Technology Co., Ltd., Shenzhen, Guangdong (CN)

(72) Inventor: Sikun Hao, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 36 days.

(21) Appl. No.: 14/381,010

(22) PCT Filed: Aug. 18, 2014

(86) PCT No.: PCT/CN2014/084636
§ 371 (c)(1),
(2) Date: Aug. 26, 2014

(51) Int. Cl.
*G02F 1/1337* (2006.01)
*G02F 1/1343* (2006.01)
*G02F 1/1335* (2006.01)
*G02F 1/1339* (2006.01)
*G02F 1/1341* (2006.01)
G02F 1/1333 (2006.01)

(52) U.S. Cl.
CPC ........ *G02F 1/134309* (2013.01); *G02F 1/1337* (2013.01); *G02F 1/1341* (2013.01); *G02F 1/13394* (2013.01); *G02F 1/13439* (2013.01); *G02F 1/133514* (2013.01); *G02F 1/133528* (2013.01); *G02F 1/133707* (2013.01); *G02F 2001/133354* (2013.01); *G02F 2001/133531* (2013.01); *G02F 2001/133541* (2013.01)

(58) Field of Classification Search
CPC .......................... G02F 1/133707; G02F 1/1393
See application file for complete search history.

(56) References Cited

U.S. PATENT DOCUMENTS

2009/0040446 A1* 2/2009 Hong .................. G02F 1/13394
349/129

* cited by examiner

Primary Examiner — Phu Vu
(74) Attorney, Agent, or Firm — Andrew C. Cheng

(57) ABSTRACT

The LCD panel includes a first substrate having a first electrode, a second substrate having a second electrode and an opaque area, and a liquid crystal layer located between the first substrate and the second substrate. The opaque area is located within a vertical projection area projected by the first electrode. A protrusion structure is disposed on the first electrode or the second electrode. The protrusion structure is located within a vertical projection area projected by the opaque area. An alignment film is coated on a surface of the protrusion structure such that each liquid crystal molecule in the liquid crystal layer located between the first electrode and the second electrode has a pretilt angle. Through the above method, the present invention can increase the light transmittance, and reduce the number of the mask and the cost.

15 Claims, 8 Drawing Sheets

LIQUID CRYSTAL DISPLAY PANEL AND FABRICATION METHOD FOR THE SAME

BACKGROUND OF THE INVENTION

1. Field of the Invention

The present invention relates to the liquid crystal display technology and more particularly to a liquid crystal display (LCD) panel and fabrication method for the same.

2. Description of Related Art

An LCD panel is widely used in various electronic display devices, such as a mobile phone, a personal digital assistant (PDA), a digital camera, a computer and a laptop. The electronic display devices are all use high resolution color displays. An LCD panel commonly includes a TN (Twist Nematic) display panel, a VA (Vertical Alignment) display panel, a MVA (Multi-domain Vertical Alignment) display panel or an IPS (In-plane switching) display panel. Wherein, the VA display panel has advantages of high aperture ratio, high resolution, and wide viewing angle such that the VA display panel has been widely used in the large-size liquid crystal display.

However, the VA display panel has not been widely used in the small-size liquid crystal display. As shown in FIG. 1, in a pixel structure of the conventional VA display panel, the pixel electrode 101 on the array substrate is usually designed as a fishbone shape and being divided into multiple domains to improve the viewing angle property. A common electrode 102 on the color filter substrate is a one-piece strip and transparent electrode. In an initial alignment of the liquid crystal molecules, the pixel electrode 101 having the fishbone shape is used for the alignment such that the liquid crystal molecules have multiple pretilt angles in different directions in order to improve the viewing angle characteristic. However, when using the pixel electrode 101 having the fishbone shape to drive the LCD panel to display, the middle area of the pixel electrode 101 generates two dark lines 201 and 202 which are perpendicular to each other as shown in FIG. 2. When the size of the display panel is smaller, the influence of the two dark lines 201 and 202 to the light transmittance is more significant. Therefore, the VA display panel is not suitable for a high resolution, small size, and portable display device.

To solve the above technical problem, the prior art usually utilizes a pixel structure shown in FIG. 3a and FIG. 3b in a small size VA display panel. In FIG. 3a, a display panel comprises an array substrate 31, a color filter (CF) substrate 32, and a liquid crystal layer 33 disposed between the array substrate 31 and the CF substrate 32. A pixel electrode 34 is disposed at a side of the array substrate 31 adjacent to the liquid crystal layer 33. A common electrode 35 is disposed at a side of the CF substrate 32 adjacent to the liquid crystal layer 33. As shown in FIG. 3b, the pixel electrode 34 does not have the fishbone shape structure. For performing the alignment of the liquid crystal molecules, a circular hole structure 351 is disposed on the common electrode 35 of the CF substrate 32. The circular hole structure 351 can generate a wedge-shape electric field such that the liquid crystal molecules can have multiple pretilt angles in different directions. In the pixel structure, the pixel electrode 34 on the array substrate 31 does not have the fishbone shape structure, a dark line is only generated at the location of the circular hole structure 351. Comparing to the conventional fishbone shape electrode, the present invention can avoid the light transmittance from decreasing because of the fishbone shape electrode. However, because the circular hole structure 351 is added at the CF substrate 32, an additional mask is required in the fabrication process to remove a portion of the electrode at the location of the circular hole structure 351 such that the cost is increased.

SUMMARY OF THE INVENTION

The main technology problem solved by the present invention is to provide a liquid crystal display panel and a fabrication for the same. The present invention can improve the light transmittance; reduce the number of masks and the costs.

In order to solve the above problems, a technique solution used in the present invention is: a liquid crystal display (LCD) panel comprising: a first substrate having a first electrode; a second substrate having a second electrode and an opaque area; and a liquid crystal layer located between the first substrate and the second substrate; wherein, the first electrode is disposed at a side of the first substrate adjacent to the liquid crystal layer; the second electrode is disposed at a side of the second substrate adjacent to the liquid crystal layer; multiple monomers are disposed in the liquid crystal layer; wherein, the opaque area is located within a vertical projection area projected by the first electrode; a protrusion structure is disposed on the first electrode or the second electrode; the protrusion structure is located within a vertical projection area projected by the opaque area; an alignment film is coated on a surface of the protrusion structure; the alignment film and the monomers function jointly such that each liquid crystal molecule in the liquid crystal layer located between the first electrode and the second electrode has a pretilt angle; and wherein, the protrusion structure has a regular shape such that the liquid crystal layer located between the first electrode and the second electrode has at least two liquid crystal regions that the liquid crystal molecules are tilting at different directions.

Wherein, the protrusion structure is a cone, a frustum, a columnar body, or a polyhedron; a top of the protrusion structure contacts or does not contact with an inner surface of the electrode opposite to the protrusion structure.

Wherein, the electrode opposite to the protrusion structure does not have a fishbone shape structure, a projection, and a crack.

Wherein, the second substrate is a color filter (CF) substrate; the protrusion structure is disposed on the second electrode; the protrusion structure is made of a material that is the same as a black matrix layer, a color resist layer or a photo spacer (PS) layer.

Wherein, the LCD panel further includes an upper polarizer and a lower polarizer that light absorption axes of the upper polarizer and the lower polarizer are perpendicular to each other; the upper polarizer is disposed at a side of the second substrate opposite to the liquid crystal layer; and the lower polarizer is disposed at a side of the first substrate opposite to the liquid crystal layer; the upper polarizer and the lower polarizer are both circular polarizers.

In order to solve the above problems, a technique solution used in the present invention is: a liquid crystal display (LCD) panel comprising: a first substrate having a first electrode; a second substrate having a second electrode and an opaque area; and a liquid crystal layer located between the first substrate and the second substrate; wherein, the first electrode is disposed at a side of the first substrate adjacent to the liquid crystal layer; the second electrode is disposed at a side of the second substrate adjacent to the liquid crystal layer; wherein, the opaque area is located within a vertical projection area projected by the first electrode; a protrusion structure is disposed on the first electrode or the second electrode; the protrusion structure is located within a vertical projection area projected by the opaque area; an alignment film is coated on a surface of the protrusion structure such that each liquid crystal molecule in the liquid crystal layer located between the first electrode and the second electrode has a pretilt angle.

Wherein, the protrusion structure has a regular shape such that the liquid crystal layer located between the first electrode and the second electrode has at least two liquid crystal regions that the liquid crystal molecules are tilting at different directions.

Wherein, the protrusion structure is a cone, a frustum, a columnar body, or a polyhedron; a top of the protrusion structure contacts or does not contact with an inner surface of the electrode opposite to the protrusion structure.

Wherein, the electrode opposite to the protrusion structure does not have a fishbone shape structure, a projection, and a crack.

Wherein, the second substrate is a color filter (CF) substrate; the protrusion structure is disposed on the second electrode; the protrusion structure is made of a material that is the same as a black matrix layer, a color resist layer or a photo spacer (PS) layer.

Wherein, the LCD panel further includes an upper polarizer and a lower polarizer which light absorption axes of the upper polarizer and the lower polarizer are perpendicular to each other; the upper polarizer is disposed at a side of the second substrate opposite to the liquid crystal layer; and the lower polarizer is disposed at a side of the first substrate opposite to the liquid crystal layer; the upper polarizer and the lower polarizer are both circular polarizers.

Wherein, multiple monomers are disposed in the liquid crystal layer; the alignment film and the monomers function jointly such that each of the liquid crystal molecules in the liquid crystal layer located between the first electrode and the second electrode has the pretilt angle.

In order to solve the above problems, a technique solution used in the present invention is: a liquid crystal display (LCD) panel comprising: a fabrication method for a liquid crystal display (LCD) panel, comprising: providing a first substrate, a second substrate, and liquid crystal molecules, wherein, the second substrate includes an opaque area; forming a first electrode at a side of the first substrate, and forming a second electrode at a side of the second substrate; forming a protrusion structure on the first electrode or the second electrode, and coating an alignment film on a surface of the protrusion structure; aligning the first substrate and the second substrate, and wherein, the first electrode and the second electrode are located between the first substrate and the second substrate; disposing the protrusion structure within a vertical projection area projected by the first electrode onto the second substrate; disposing the protrusion structure within a vertical projection area projected by the opaque area; and injecting the liquid crystal molecules between the first substrate and the second substrate to form a liquid crystal layer; wherein, under the function of the alignment film, each of the liquid crystal molecules in the liquid crystal layer located between the first electrode and the second electrode has a pretilt angle.

Wherein, the step of forming a protrusion structure on the first electrode or the second electrode comprises: forming the protrusion structure with a regular shape on the first electrode or the second electrode such that the liquid crystal layer located between the first electrode and the second electrode has at least two liquid crystal regions that the liquid crystal molecules are tilting at different directions.

Wherein, the step of forming the protrusion structure with a regular shape on the first electrode or the second electrode comprises: forming the protrusion structure with a cone shape, a frustum shape, a columnar body shape, or a polyhedron shape; and making a top of the protrusion structure be contacted or be not contacted with an inner surface of the electrode opposite to the protrusion structure.

The beneficial effects of the present invention are: comparing to the prior art, the LCD panel of the present invention including a protrusion structure disposed on the first electrode or the second electrode. The surface of the protrusion structure is coated with an alignment film such that each liquid crystal molecule in the liquid crystal layer located between the first electrode and the second electrode has a pretilt angle. Through the protrusion structure to achieve the alignment of the liquid crystal molecules, comparing to the alignment of the circular hole structure in the prior art, the present invention does not require an additional mask so as to reduce the number of the mask and the cost. Besides, the protrusion structure disposed within a vertical projection area projected by the opaque area in order to avoid the protrusion structure forming dark lines in the transparent area so as to increase the light transmittance.

BRIEF DESCRIPTION OF THE DRAWINGS

FIG. 3b is an exploded schematic diagram of a pixel structure of the liquid crystal display panel shown in FIG. 3a;

DETAILED DESCRIPTION OF THE PREFERRED EMBODIMENT

The following content combines with the drawings and the embodiment for describing the present invention in detail. It is obvious that the following embodiments are only some embodiments of the present invention. For the skilled persons of ordinary skill in the art without creative effort, the other embodiments obtained thereby are still covered by the present invention.

Figure 1:
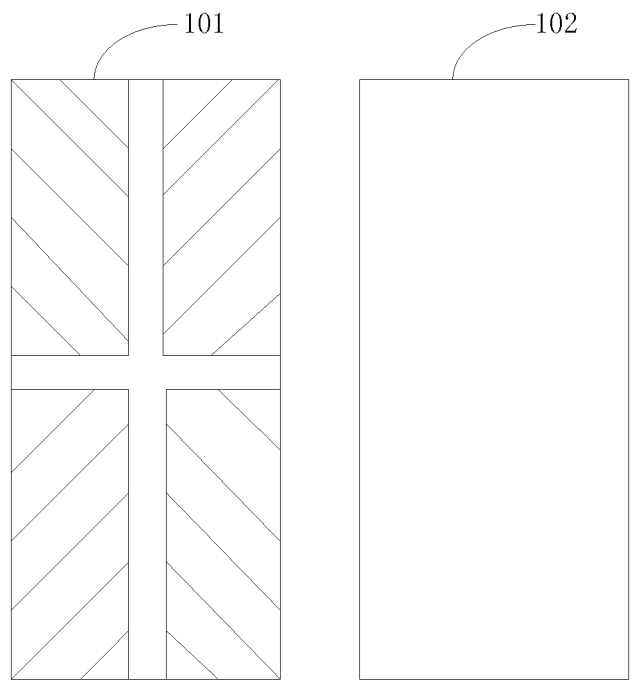
FIG. 1 is an exploded schematic diagram of a pixel structure of a liquid crystal display panel according to the prior art.
Figure 2:
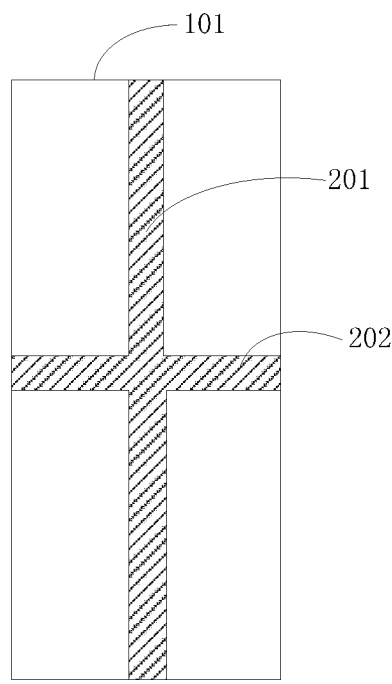
FIG. 2 is an optical property diagram of the pixel structure when displaying shown in FIG. 1.
Figure 3A:
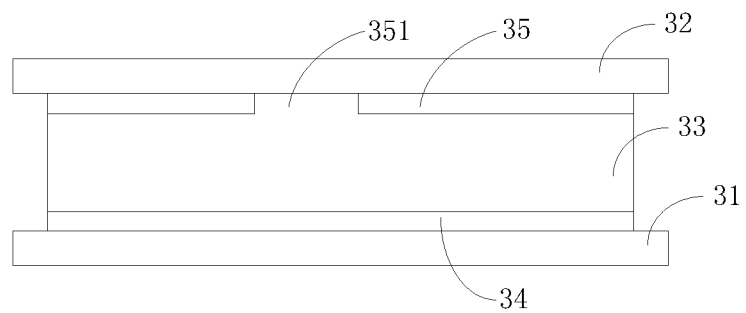
FIG. 3a is a schematic diagram of a pixel structure of another liquid crystal display panel according to the prior art.
Figure 3B:
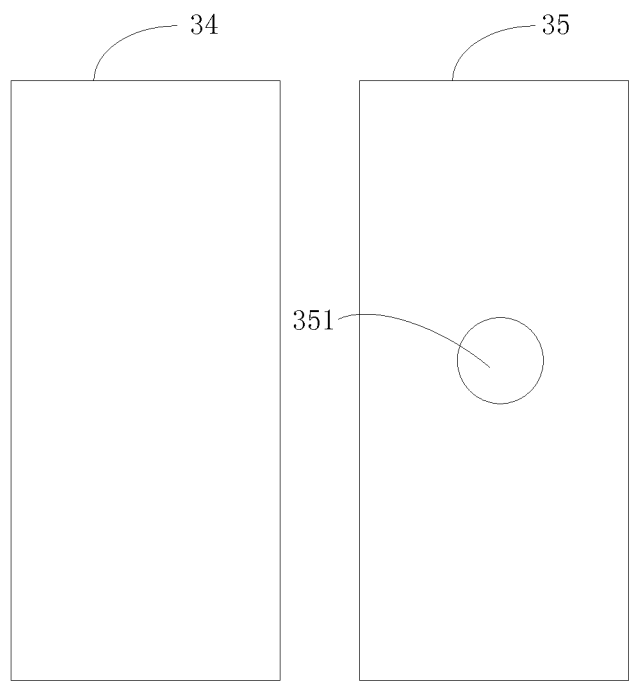
Figure 4:
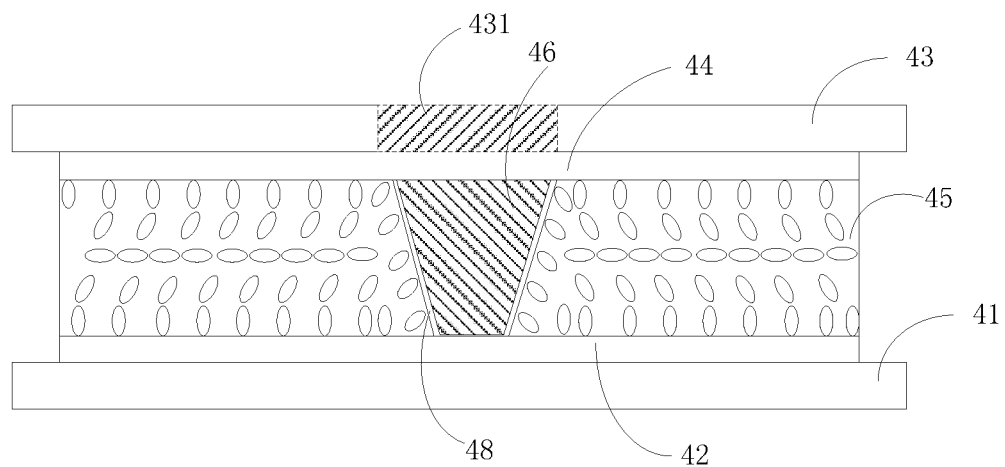
FIG. 4 is a schematic diagram of a liquid crystal panel according to an embodiment of the present invention.

With reference to FIG. 4, in an embodiment of a liquid crystal display (LCD) panel of the present invention, the LCD panel includes a first substrate 41, a second substrate 43, and a liquid crystal layer 45 located between the first substrate 41 and the second substrate 43. A first electrode 42 is disposed at a side of the first substrate 41 adjacent to the liquid crystal layer 45. A second electrode 44 is disposed at a side of the second substrate 43 adjacent to the liquid crystal layer 45. Through applying a voltage on the first electrode 42 and the second electrode 44, the LCD panel can be driven to display.

In the present embodiment, the first substrate 41 is an array substrate. The first substrate 41 provided with a drive assembly for driving the LCD panel to display. For example, the drive assembly may include thin film transistors, scanning lines, data lines and other devices. The second substrate 43 is a color filter (CF) substrate. The second substrate 43 is provided with a color resist layer and other devices in order to display various colors. The first electrode 42 disposed on the first substrate 41 is a pixel electrode. The second electrode 44 disposed on the second substrate 43 is a common electrode. The first electrode 42 and the second electrode 44 are both made of transparent material. Wherein, the number of the first electrode 42 is multiple, and arranged as a matrix. One of the first electrode 42, the second electrode 44 corresponding to the one of first electrode 42, and the liquid crystal layer 45 located between the one of the first electrode 42 and the second electrode 44 corresponding to the one of the first electrode 42 jointly define a pixel structure.

Figure 5:
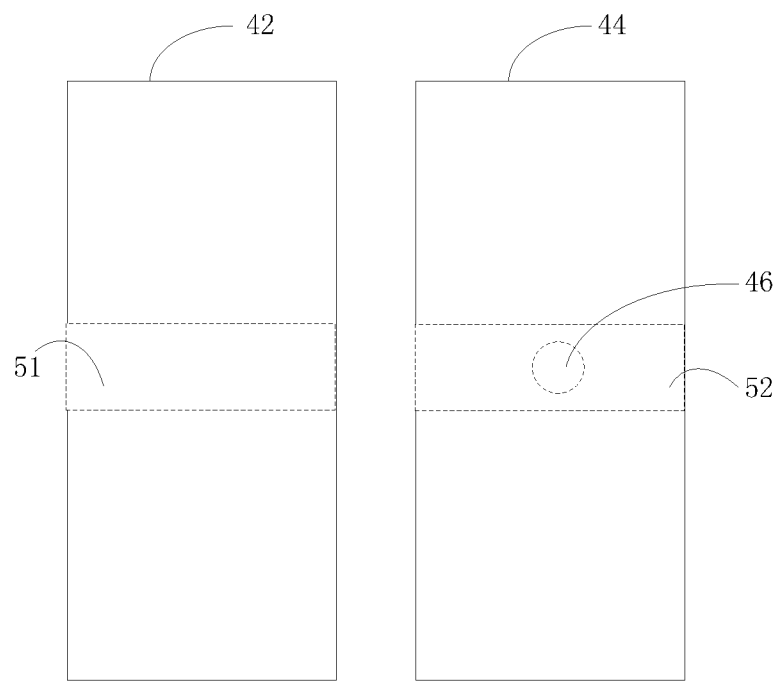
FIG. 5 is an exploded schematic diagram of a first electrode and a second electrode a liquid crystal display panel according to an embodiment of the present invention.

Wherein, the second substrate 43 includes an opaque area 431. The opaque area 431 is the area where a black matrix (BM) is located. As shown in FIG. 5, the opaque area 431 of the second substrate 43 is located within a vertical projection area projected by the first electrode 42 onto the second substrate 43, and a portion of the driving assembly such as a scanning line 51 is located within a vertical projection area projected by the opaque area 431 onto the first substrate 41.

That is, in the present embodiment, the black matrix on the color filter substrate is located at a position of the second substrate 43 corresponding to the pixel electrode, not located at a position of the second substrate 43 corresponding to a location between two pixel electrodes as the prior art. The driving assembly on the first substrate 41 such as the scanning line and the TFT is located an area where the pixel electrode is located, not located at an area between two pixel electrodes as the prior art. Besides, the scanning line and the TFT are located within a vertical projection area projected by the black matrix onto the first substrate 41.

Wherein, a protrusion structure 46 is disposed on the second electrode 44, and the protrusion structure 46 is located within a vertical projection area 52 projected by the opaque area 431 onto the second electrode 44. The protrusion structure 46 is made of a material that is the same as the black matrix. An alignment film 48 is coated on the surface of the protrusion structure 46, and the alignment film 48 can be a polyimide (PI) alignment film. Because the polyimide alignment film has an anchored function to the liquid crystal molecules, by the function of the polyimide alignment film, the liquid crystal molecules can be arranged according to specific directions and pretilt angles.

Figure 6:
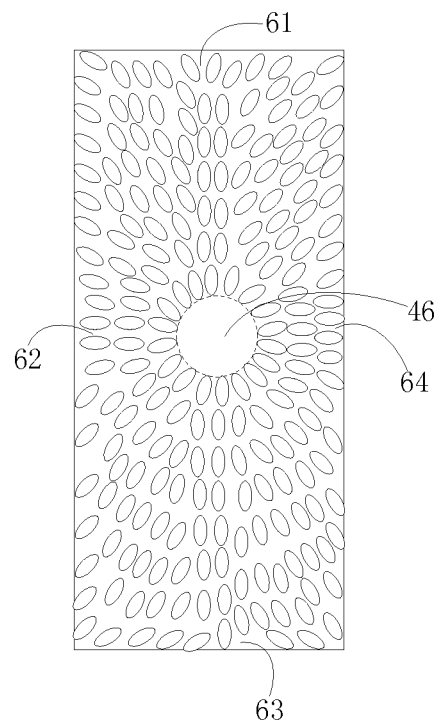
FIG. 6 is a schematic diagram of the initial alignment of liquid crystals of the LCD panel according to an embodiment of the present invention.

In the present embodiment, as shown in FIG. 6, the protrusion structure 46 is disposed on the second electrode 44. Therefore, in an initial alignment process of the liquid crystal molecules, under the function of the alignment film 48 coated on the surface of the protrusion structure 46, the liquid crystal molecules between the first electrode 42 and the second electrode 44 can tilt toward the protrusion structure 46 according to specific tilt angles (that is the pretilt angle). Therefore, each of the liquid crystal molecules has a pretilt angle, and at the same time, inside one pixel structure (that is between the first electrode and the second electrode), the one pixel structure has multiple liquid crystal regions that the liquid crystal molecules tilt in different directions so as to achieve the initial alignment of the liquid crystal molecules.

Of course, the protrusion structure 46 can also be made of a material that is the same as the color resist layer or a photo spacer (PS) layer.

Wherein, the shape of the protrusion structure 46 is regular such that the liquid crystal layer between the first electrode 42 and the second electrode 44 has at least two liquid crystal regions with different tilting directions of the liquid crystal molecules. In the present embodiment as shown in FIG. 4, the protrusion structure 46 is a cone, and the surface of the protrusion structure 46 is flat without an edge and corner structure. The top of the protrusion structure 46 contacts with the inner surface of the first electrode 42 which is opposite to the protrusion structure 46, that is, the protrusion structure 46 contacts with the surface of the first electrode 42 adjacent to the liquid crystal layer 45.

As shown in FIG. 6, during the initial alignment process, under the function of the PI alignment film 48 coated on the surface of the protrusion structure 46, the liquid crystal molecules at different locations are tilted toward the protrusion structure 46, and are orderly surrounded the circular protrusion structure 46. That is, in the liquid crystal layer 45 located between the first electrode 42 and the second electrode 44, multiple liquid crystal regions having liquid crystal molecules tilted at different directions are existed. Using the protrusion structure 46 as a reference point, the liquid crystal molecules of a first liquid crystal region 61 are tilted downward, the liquid crystal molecules of a second liquid crystal region 62 are tilted to the right, the liquid crystal molecules of a third liquid crystal region 63 are tilted upward, and the liquid crystal molecules of a fourth liquid crystal region 64 are tilted to the left. Of course, the liquid crystal molecules between the first and second liquid crystal regions 61, 62, the liquid crystal molecules between the first and fourth liquid crystal regions 61, 64, the liquid crystal molecules between the second and third liquid crystal regions 62, 63, and the liquid crystal molecules between the third and fourth liquid crystal regions 63, 64 can be tilted at other directions. Besides, no clear dividing line is existed between each of the liquid crystal regions.

Wherein the downward, right, upward, and left, are relative to the view shown in FIG. 6. On the base of the other views, another expression method may exist. By forming the multiple liquid crystal regions that the liquid crystal molecules are tilted at different directions, the LCD panel has a better wide-viewing-angle property.

Wherein, in the present embodiment, the first electrode 42 as the electrode which is opposite to the protrusion structure 46 does not have has a fishbone shape structure, a projection, and a crack. That is, when the protrusion structure 46 is disposed on the second electrode 44, the first electrode 42 that is as the electrode opposite to the protrusion structure 46 is a one-piece strip and transparent electrode. The strip and transparent electrode does not provided with the fishbone shape structure, the crack and the projection matching with the protrusion structure 46. Therefore, in the initial alignment process of the liquid crystal molecules, only the protrusion structure 46 on the second electrode 44 is used for the alignment so that the liquid crystal regions with the liquid crystal molecules tilting at different directions do not have obvious dividing lines, as shown in FIG. 6. In another embodiment, when the protrusion structure 46 is disposed on the first electrode 42, the second electrode 44 as an opposite electrode does not provide with the fishbone shape structure, the crack and the projection.

Wherein, the location of the opaque area 431 of the second substrate 43 is corresponding to a middle portion of the first electrode 42 so that the protrusion structure 46 is also corresponding to a middle portion of the first electrode 42. Of course, the opaque area 431 can also be disposed corresponding to an edge area of the first electrode 42 or other areas.

Figure 7:
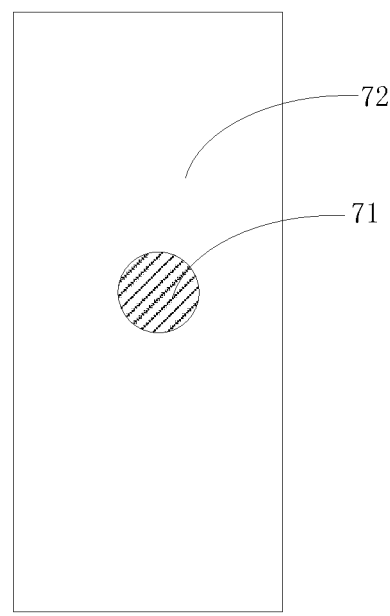
FIG. 7 is an optical property diagram of one pixel structure according to an embodiment of the LCD panel of the present invention.

In this embodiment, using the protrusion structure 46 to achieve the initial alignment, the liquid crystal molecules in one pixel structure are all surrounded the protrusion structure 46 and are tilted toward the protrusion structure 46, as shown in FIG. 7. Therefore, when driving the LCD panel to display, only the location of the protrusion structure 46 forms a dark area 71, and the other area 72 is a transparent area. Comparing to the two dark lines which are perpendicular to each other and generated by the fishbone shape pixel electrode in the prior art, the light transmittance of the present invention is greatly increased, and does not require an additional mask so as to reduce the number of the mask and the cost.

In addition, the protrusion structure 46 is located within the vertical projection area 52 projected by the opaque area 431, that is, the protrusion structure 46 is also disposed corresponding to the location of the black matrix. As a result, even the location of the protrusion structure 46 will form a dark area; the light transmittance area of the first electrode 42 will not be influenced in order to further improve the light transmittance.

In the subsequent process for driving the LCD panel to display, after applying the voltage on the first electrode 42 and the second electrode 44, an electric field is formed in the liquid crystal layer 45, under the function of the electric field, the liquid crystal molecules having the initial pretilt angels and pretilt directions guide the adjacent liquid crystal molecules to arrange orderly so as to achieve the display of the LCD panel.

Of course, in the embodiments of the present invention, the protrusion structure 46 can be a cone, a frustum, a columnar body, or a polyhedron. The protrusion structures 46 with different shapes, through the alignment films coated on the surfaces of the protrusion structures 46, the liquid crystal molecules can have pretilt angles and tilted toward the protrusion structures 46 such that the liquid crystal molecules in one pixel structure can have multiple tilting directions.

Besides, the shape of the protrusion structure 46 can also be irregular such as an irregular tetrahedron. The size of the protrusion structure 46 can also be disposed according to the requirement. The only one condition is that the protrusion structure 46 cannot exceed the vertical projection area projected by the opaque area 431.

Besides, the top of the protrusion structure 46 may also not contact with the inner surface of the first electrode 42. A distance may exist there between. Of course, the protrusion structure 46 can also be disposed on the first electrode 42, and located within the vertical projection area projected by the opaque area 431 onto the first electrode 42.

Figure 8:
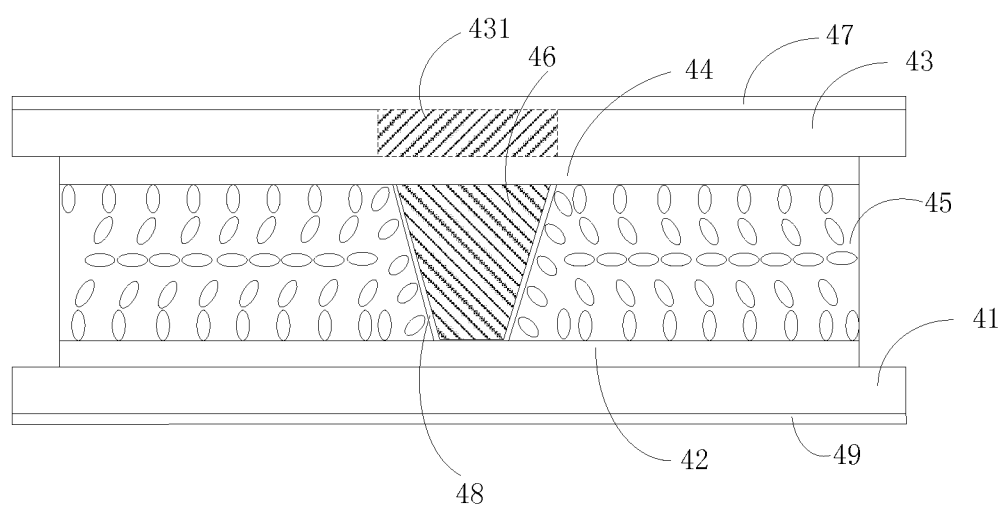
FIG. 8 is a schematic structural view of another embodiment of a liquid crystal panel of the present invention exhibits.

In an embodiment of the present invention, as shown in FIG. 8, the LCD panel further includes an upper polarizer 47 and a lower polarizer 49 that light absorption axes of the upper polarizer and the lower polarizer are perpendicular to each other The upper polarizer 47 is disposed at a side of the second substrate 43 opposite to the liquid crystal layer 45, and the lower polarizer 49 is disposed at a side of the first substrate 41 opposite to the liquid crystal layer 45. Wherein, the upper polarizer 47 and the lower polarizer 49 are both circular polarizers.

In the initial alignment of the liquid crystal molecules of the present invention, the liquid crystal molecules surround the protrusion structure 46 to form a tilt arrangement in one pixel structure. The liquid crystal molecules have multiple tilt directions, and coordinate with the circular polarizers can reduce the appearance of dark lines in order to improve the light transmittance.

Figure 9:
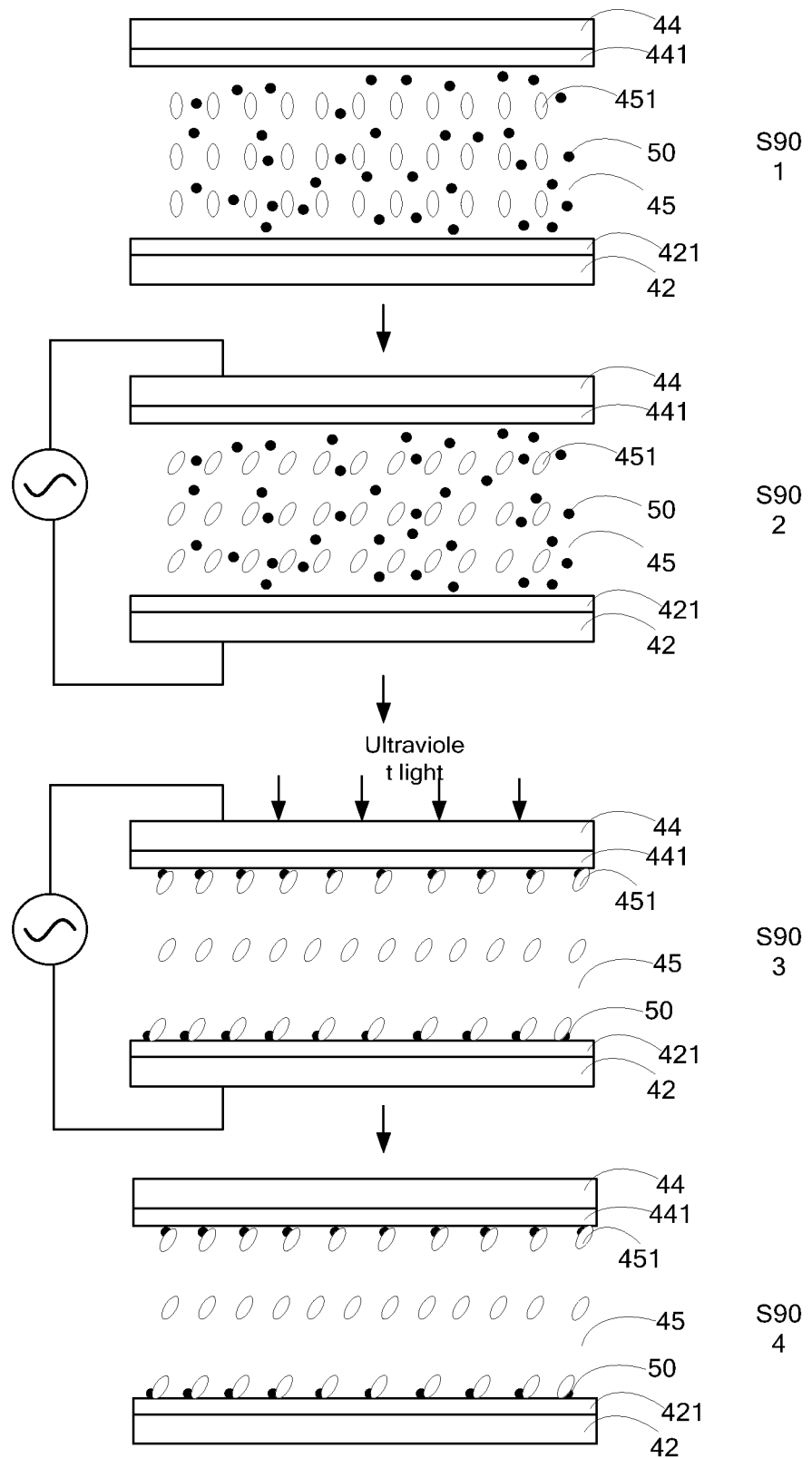
FIG. 9 is a schematic diagram of mixing with the monomers into the liquid crystal layer to form the pretilt angles in the alignment process according to an embodiment of the LCD panel of the present invention, wherein, the diagram only illustrate a portion of the LCD panel.

In order to improve the response time of the liquid crystal molecules, in an embodiment of the present invention, as shown in FIG. 9, the liquid crystal layer 45 is mixed with multiple monomers 50 in order to assist the initial alignment of the liquid crystal molecules. The monomers 50 are light-sensitive monomer molecules. When the monomers 50 are irradiated by the light, the monomers 50 will react to form polymers for assisting the alignment such that the liquid crystal molecules can be tilted at certain directions. In the initial alignment process of the liquid crystal molecules, under the function of the PI alignment film 48 on the surface of the protrusion structure 46, the liquid crystal molecules have pretilt angles such that when driving the LCD panel to display, the liquid crystal molecules can arrange fast along the tilt directions of the initial alignment. However, when the liquid crystal molecules are far away from the protrusion structure 46, the influence of the PI alignment film 48 on the surface of the protrusion structure 46 is smaller. The time required for the liquid crystal molecules far away from the protrusion structure 46 to rotate to a desired display angle is longer. In the embodiment, through mixing with the monomers 50 into the liquid crystal layer, most of the liquid crystal molecules can form a desired pretilt angle so as to reduce the response time for the liquid crystal molecules away from the protrusion structure 46 in order to increase the response speed of the liquid crystal molecules.

Furthermore, when the monomers 50 is mixed into the liquid crystal molecules, in the initial alignment process, the liquid crystal molecules are required to be irradiated by an ultraviolet (UV) light such that the liquid crystal molecules can form the pretilt angles. Specifically, as shown in FIG. 9, FIG. 9 is a schematic diagram of mixing with the monomers into the liquid crystal layer to form the pretilt angles in the alignment process. Wherein, the diagram only illustrates a portion of the LCD panel. Besides, as shown in FIG. 9, in the present embodiment, an alignment film 421 is coated on the first electrode 42 adjacent to the liquid crystal layer 45, and an alignment film 441 is coated on the second electrode 44 adjacent to the liquid crystal layer 45 to achieve the alignment for the liquid crystal molecules 451. In a step S901, mixing the monomers 50 into the liquid crystal molecules. In a step S902, applying a voltage on a first electrode 42 and a second electrode 44 such that the liquid crystal molecules 451 between the first electrode 42 and the second electrode 44 have pretilt angles. Under the function of the electric field, the liquid crystal molecules far away from the protrusion structure 46 are controlled to form required pretilt angles.

In a step S903, irradiating the liquid crystal layer 45 with an UV light such that the liquid crystal molecules 451 are fixed in an arrangement state of having pretilt angles and titled along preset directions. When irradiating the liquid crystal layer 45 with the UV light, the monomers 50 react to form polymers under the function of the UV light. Under the function of the polymers, the liquid crystal molecules 451 having the pretilt angles are fixed at the surface of the alignment films 441, 421. In a step S904, stop irradiating with the UV light and stop applying the voltage on the first electrode 42 and the second electrode 44. After stop irradiating with the UV light, the liquid crystal molecules 451 are fixed in an arrangement state of having pretilt angles and titled along preset directions.

Therefore, after stop applying the voltage on the first electrode 42 and the second electrode 44, the liquid crystal molecules 451 are still fixed in an arrangement state of having pretilt angles and titled along preset directions in order to achieve the initial alignment.

Figure 10:
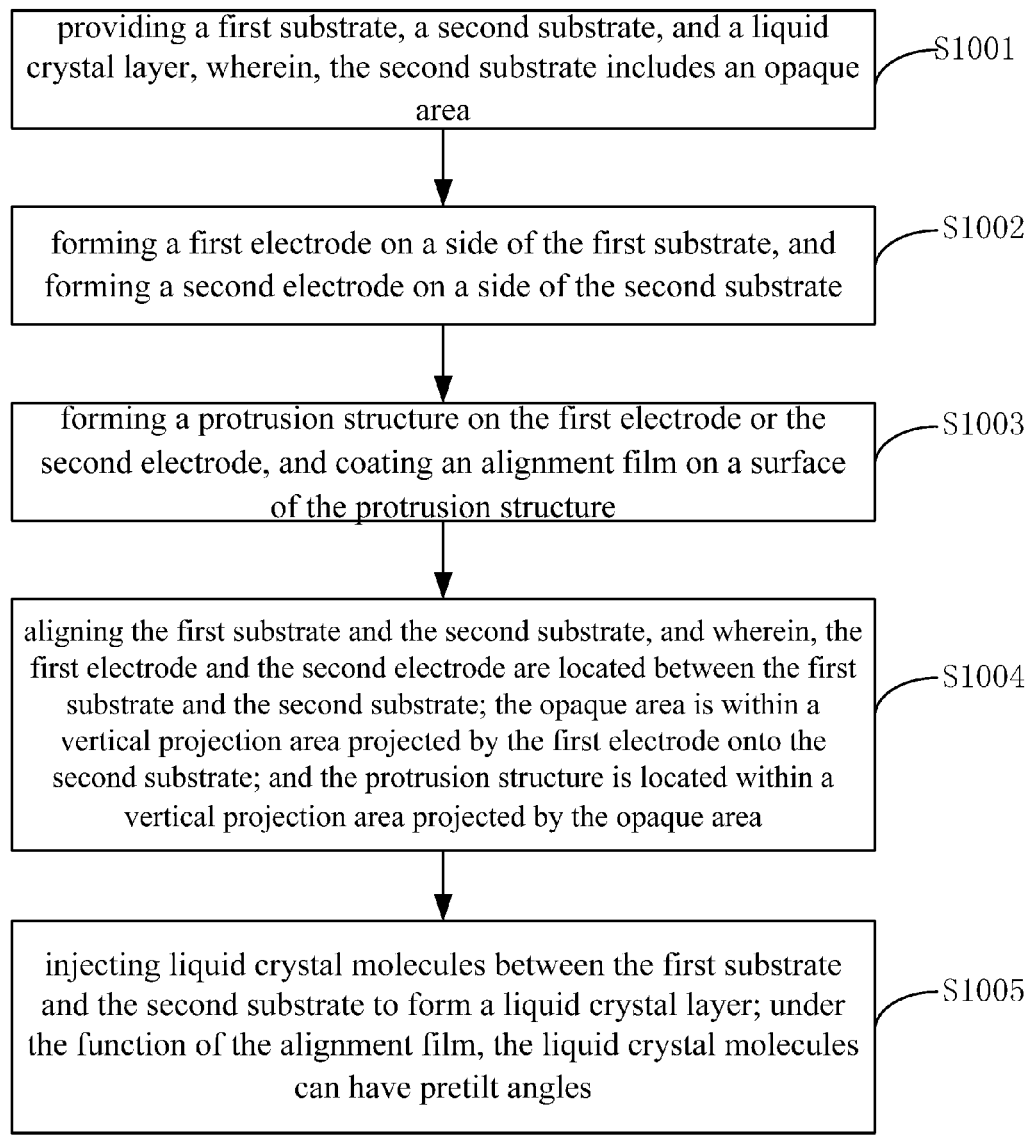
FIG. 10 is a flow chart of fabrication method according to an embodiment of the LCD panel of the present invention.

With reference to FIG. 10, FIG. 10 is a flow chart of fabrication method according to an embodiment of the LCD panel of the present invention, comprising steps of:

Step S1001: providing a first substrate, a second substrate, and a liquid crystal layer. Wherein, the second substrate includes an opaque area. In this embodiment, the first substrate is used for forming an array substrate, and the second substrate is used for forming a color filter substrate. In the subsequent process, the color filter substrate is usually disposed with a black matrix in order to separate different color resists with different colors. The opaque area of the second substrate corresponds to the location of the black matrix.

Step S1002: forming a first electrode on a side of the first substrate, and forming a second electrode on a side of the second substrate. The first electrode functions as a pixel electrode and is disposed on the first substrate. The second electrode functions as a common electrode and is disposed on the second substrate. The first electrode and the second electrode are used for achieving the display of the LCD panel.

Step S1003: forming a protrusion structure on the first electrode or the second electrode, and coating an alignment film on a surface of the protrusion structure. In this embodiment, the protrusion structure is formed on the second electrode, and is made of a material that is the same as the black matrix. Of course, the protrusion structure 46 can also be made of a material that is the same as a color resist layer or a photo spacer layer.

Step S1004: aligning the first substrate and the second substrate, and wherein, the first electrode and the second electrode are located between the first substrate and the second substrate; the opaque area is within a vertical projection area projected by the first electrode onto the second substrate; and the protrusion structure is located within a vertical projection area projected by the opaque area. Bonding the first substrate and the second substrate to form a liquid crystal cell, wherein, the first electrode and the second electrode are adjacent, that is, the side of the first substrate disposed with the first electrode is adjacent to the side of the second substrate disposed with the second electrode. Besides, an area of the second substrate used for disposing with the black matrix is located within a vertical projection area projected by the first electrode. When the protrusion structure is formed on the second electrode, the protrusion structure is located within a vertical projection area projected by the black matrix onto the second electrode.

Step S1005: injecting liquid crystal molecules between the first substrate and the second substrate to form a liquid crystal layer. Under the function of the alignment film, the liquid crystal molecules can have pretilt angles.

Through coating the alignment film on the surface of the protrusion structure such that in the initial alignment process of the liquid crystal molecules, the liquid crystal molecules can tilt according to specific tilt angles. Therefore, the molecules have pretilt angles.

In this embodiment, through forming the protrusion structure on the second electrode, using the protrusion structure to achieve the initial alignment, under the function of the protrusion structure, the liquid crystal molecules are all surrounded the protrusion structure and are tilted toward the protrusion structure. Therefore, when driving the LCD panel to display, only the location of the protrusion structure forms a dark area, and the other area is a transparent area. Comparing to the two dark lines which are perpendicular to each other and are generated by the fishbone shape pixel electrode, the light transmittance is greatly increased, and does not require an additional mask so as to reduce the number of the mask and the cost. Besides, through using the protrusion structure to achieve the initial alignment, inside one pixel structure, multiple liquid crystal regions having the liquid crystal molecules tilting in different directions are formed so that the LCD panel can have a better wide-viewing-angle property.

In addition, the protrusion structure is located within the vertical projection area projected by the opaque area, that is, the protrusion structure is disposed corresponding to the location of the black matrix. As a result, even the location of the protrusion structure will form a dark area; the light transmittance area of the first electrode will not be influenced in order to further improve the light transmittance.

In an embodiment of the fabrication method of the LCD panel of the present invention, the step of forming the protrusion structure on the second electrode comprising: forming the protrusion structure by a regular shape on the second electrode such that the liquid crystal layer between the first electrode and the second electrode has at least two liquid crystal regions that the liquid crystal molecules are titled at different directions.

Specifically, in this embodiment, forming the protrusion structure with a cone shape on the second electrode, and making the top of the protrusion structure be contacted with the inner surface of the first electrode as the electrode opposite to the protrusion structure. Through the cone-shaped protrusion structure, the liquid crystal molecules between the first electrode and the second electrode can surround the circular protrusion structure to arrange orderly. Therefore, the liquid crystal molecules around the protrusion structure are tilted in different directions, but the liquid crystal molecules are all tilted toward the protrusion structure. That is, in the liquid crystal layer between the first electrode and the second electrode, multiple liquid crystal regions having the liquid crystal molecules tilting in different directions are formed so as to achieve the initial alignment of the liquid crystal molecules, and the LCD panel has a better wide-viewing-angle property.

Of course, in another embodiment of the present invention, the protrusion structure can be a frustum shape, a columnar body shape, or a polyhedron shape such as a square shape body. The protrusion structures with different shapes, through the alignment films coated on the surfaces of the protrusion structures, the liquid crystal molecules can have pretilt angles and tilted toward the protrusion structures such that the liquid crystal molecules in one pixel structure can have multiple tilting directions.

Besides, the shape of the protrusion structure can also be irregular such as an irregular tetrahedron. The size of the protrusion structure can also be disposed according to the requirement. The only one condition is that the protrusion structure cannot exceed the vertical projection area projected by the opaque area.

Besides, the top of the protrusion structure may also not contact with the inner surface of the first electrode. A distance may exist there between. Of course, the protrusion structure can also be disposed on the first electrode, and located within the vertical projection area projected by the opaque area onto the first electrode.

Wherein, in the present embodiment, when the protrusion structure is formed on the second electrode, in the process of forming the first electrode, the first electrode as the electrode opposite to the protrusion structure does not have a fishbone shape structure, a crack and a projection. The first electrode as the opposite electrode is a one-piece strip and transparent electrode. The strip and transparent electrode does not provided with the fishbone structure, the crack and projection matching with the protrusion structure.

Besides, in an embodiment of the present invention, after injecting the liquid crystal molecules between the first substrate and the second substrate, further comprising a step of forming an upper polarizer on a side of the first substrate opposite to the liquid crystal layer, and forming a lower polarizer on a side of the second substrate opposite to the liquid crystal layer, wherein, the upper polarizer and the lower polarizer are both circular polarizers. In the initial alignment of the liquid crystal molecules of the present invention, the liquid crystal molecules surround the protrusion structure to form a tilt arrangement in a pixel structure. The liquid crystal molecules have multiple tilt directions, and coordinate with the circular polarizers can reduce the appearance of dark lines in order to improve the light transmittance.

Figure 11:
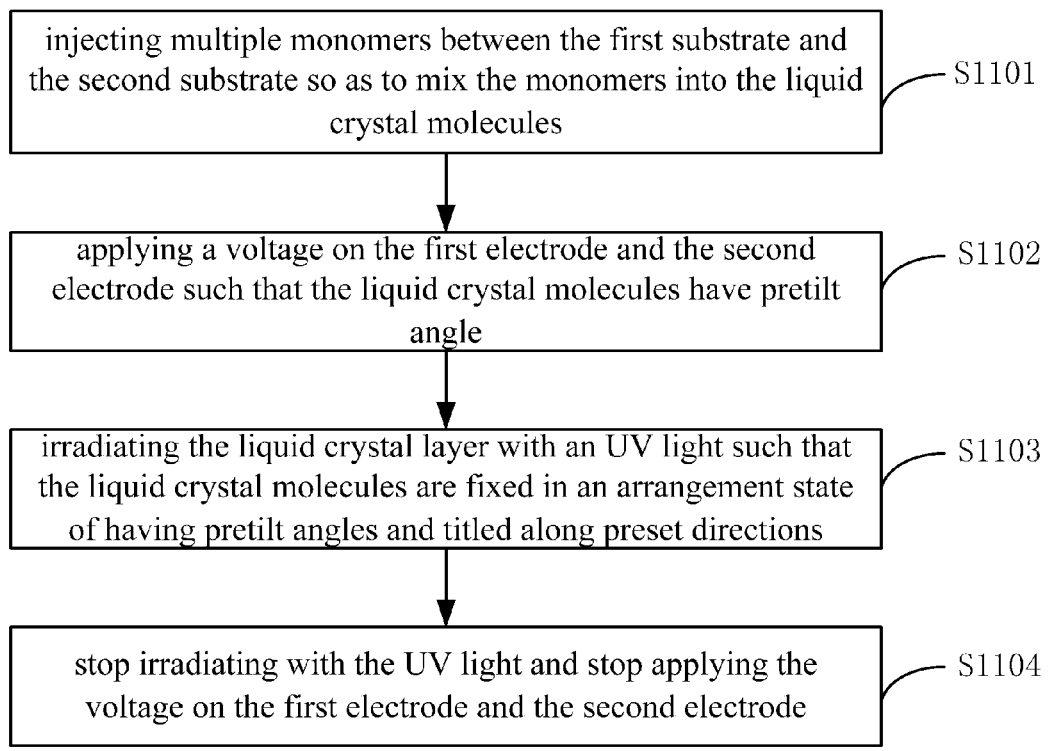
FIG. 11 is a flow chart of fabrication method after injecting the liquid crystal molecules between the first substrate and the second substrate according to an embodiment of the LCD panel of the present invention.

In order to increase the response speed of the liquid crystal molecules, and speed up the response time, in an embodiment of the present invention, as shown in FIG. 11, after injecting the liquid crystal molecules between the first substrate and the second substrate, further comprising steps of:

Step S1101: injecting multiple monomers between the first substrate and the second substrate so as to mix the monomers into the liquid crystal molecules. Wherein, before injecting the liquid crystal molecules into the first substrate and the second substrate, the monomers can be mixed into the liquid crystal molecules, then, injecting the liquid crystal molecules mixed with the monomers between the first substrate and the second substrate.

Step S1102: applying a voltage on the first electrode and the second electrode such that the liquid crystal molecules have pretilt angles. After completion of injecting the liquid crystal molecules and the monomers, in the subsequent process of the initial alignment, applying the voltage on the first electrode and the second electrode, controlling the liquid crystal molecules away from the protrusion structure to form pretilt angles.

Step S1103: irradiating the liquid crystal layer with an UV light such that the liquid crystal molecules are fixed in an arrangement state of having pretilt angles and titled along preset directions. When irradiating the liquid crystal layer with the UV light, the monomers react to form polymers. Under the function of the polymers, the liquid crystal molecules are fixed in an arrangement state of having pretilt angles and titled along preset directions.

Step S1104: stop irradiating with the UV light and stop applying the voltage on the first electrode and the second electrode. After stop irradiating with the UV light, the liquid crystal molecules are fixed in the arrangement state of having pretilt angles and titled along preset directions. Therefore, after stop applying the voltage on the first electrode and the second electrode, the liquid crystal molecules are still fixed in the arrangement state of having pretilt angles and titled along preset directions in order to achieve the initial alignment.

Through the above auxiliary alignment process, the liquid crystal molecules far away from the protrusion structure can also have requirement pretilt angle and preset tilting directions so as to increase the response speed of the liquid crystal molecules.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal display (LCD) panel comprising:
a first substrate having a first electrode;
a second substrate having a second electrode and an opaque area; and
a liquid crystal layer located between the first substrate and the second substrate;
wherein, the first electrode is disposed at a side of the first substrate adjacent to the liquid crystal layer; the second electrode is disposed at a side of the second substrate adjacent to the liquid crystal layer; multiple monomers are disposed in the liquid crystal layer;
wherein, the opaque area is located within a vertical projection area projected by the first electrode; a protrusion structure is disposed on the first electrode or the second electrode; the protrusion structure is located within a vertical projection area projected by the opaque area; an alignment film is coated on a surface of the protrusion structure; the alignment film and the monomers function jointly such that each liquid crystal molecule in the liquid crystal layer located between the first electrode and the second electrode has a pretilt angle; and
wherein, the protrusion structure has a regular shape such that the liquid crystal layer located between the first electrode and the second electrode has at least two liquid crystal regions that the liquid crystal molecules are tilting at different directions.

2. The LCD panel according to claim 1, wherein, the protrusion structure is a cone, a frustum, a columnar body, or a polyhedron; a top of the protrusion structure contacts or does not contact with an inner surface of the electrode opposite to the protrusion structure.

3. The LCD panel according to claim 2, wherein, the electrode opposite to the protrusion structure does not has a fishbone shape structure, a projection, and a crack.

4. The LCD panel according to claim 1, wherein, the second substrate is a color filter (CF) substrate; the protrusion structure is disposed on the second electrode; the protrusion structure is made of a material that is the same as a black matrix layer, a color resist layer or a photo spacer (PS) layer.

5. The LCD panel according to claim 1, wherein, the LCD panel further includes an upper polarizer and a lower polarizer that light absorption axes of the upper polarizer and the lower polarizer are perpendicular to each other; the upper polarizer is disposed at a side of the second substrate opposite to the liquid crystal layer; and the lower polarizer is disposed at a side of the first substrate opposite to the liquid crystal layer; the upper polarizer and the lower polarizer are both circular polarizers.

6. A liquid crystal display (LCD) panel comprising:
a first substrate having a first electrode;
a second substrate having a second electrode and an opaque area; and
a liquid crystal layer located between the first substrate and the second substrate;
wherein, the first electrode is disposed at a side of the first substrate adjacent to the liquid crystal layer; the second electrode is disposed at a side of the second substrate adjacent to the liquid crystal layer;
wherein, the opaque area is located within a vertical projection area projected by the first electrode; a protrusion structure is disposed on the first electrode or the second electrode; the protrusion structure is located within a vertical projection area projected by the opaque area; an alignment film is coated on a surface of the protrusion structure such that each liquid crystal molecule in the liquid crystal layer located between the first electrode and the second electrode has a pretilt angle.

7. The LCD panel according to claim 6, wherein, the protrusion structure has a regular shape such that the liquid crystal layer located between the first electrode and the second electrode has at least two liquid crystal regions that the liquid crystal molecules are tilting at different directions.

8. The LCD panel according to claim 7, wherein, the protrusion structure is a cone, a frustum, a columnar body, or a polyhedron; a top of the protrusion structure contacts or does not contact with an inner surface of the electrode opposite to the protrusion structure.

9. The LCD panel according to claim 8, wherein, the electrode opposite to the protrusion structure does not has a fishbone shape structure, a projection, and a crack.

10. The LCD panel according to claim 6, wherein, the second substrate is a color filter (CF) substrate; the protrusion structure is disposed on the second electrode; the protrusion structure is made of a material that is the same as a black matrix layer, a color resist layer or a photo spacer (PS) layer.

11. The LCD panel according to claim 6, wherein, the LCD panel further includes an upper polarizer and a lower polarizer which light absorption axes of the upper polarizer and the lower polarizer are perpendicular to each other; the upper polarizer is disposed at a side of the second substrate opposite to the liquid crystal layer; and the lower polarizer is disposed at a side of the first substrate opposite to the liquid crystal layer; the upper polarizer and the lower polarizer are both circular polarizers.

12. The LCD panel according to claim 6, wherein, multiple monomers are disposed in the liquid crystal layer; the alignment film and the monomers function jointly such that each of the liquid crystal molecules in the liquid crystal layer located between the first electrode and the second electrode has the pretilt angle.

13. A fabrication method for a liquid crystal display (LCD) panel, comprising:

providing a first substrate, a second substrate, and liquid crystal molecules, wherein, the second substrate includes an opaque area;

forming a first electrode at a side of the first substrate, and forming a second electrode at a side of the second substrate;

forming a protrusion structure on the first electrode or the second electrode, and coating an alignment film on a surface of the protrusion structure;

aligning the first substrate and the second substrate, and wherein, the first electrode and the second electrode are located between the first substrate and the second substrate; disposing the protrusion structure within a vertical projection area projected by the first electrode onto the second substrate; disposing the protrusion structure within a vertical projection area projected by the opaque area; and injecting the liquid crystal molecules between the first substrate and the second substrate to form a liquid crystal layer; wherein, under the function of the alignment film, each of the liquid crystal molecules in the liquid crystal layer located between the first electrode and the second electrode has a pretilt angle.

14. The fabrication method according to claim 13, wherein, the step of forming a protrusion structure on the first electrode or the second electrode comprises:

forming the protrusion structure with a regular shape on the first electrode or the second electrode such that the liquid crystal layer located between the first electrode and the second electrode has at least two liquid crystal regions that the liquid crystal molecules are tilting at different directions.

15. The fabrication method according to claim 14, wherein, the step of forming the protrusion structure with a regular shape on the first electrode or the second electrode comprises:

forming the protrusion structure with a cone shape, a frustum shape, a columnar body shape, or a polyhedron shape; and making a top of the protrusion structure be contacted or be not contacted with an inner surface of the electrode opposite to the protrusion structure.

\* \* \* \* \*